(12) United States Patent
Allen et al.

(10) Patent No.: US 6,673,300 B2
(45) Date of Patent: Jan. 6, 2004

(54) METHOD FOR PLUGGING SELECTED CELLS IN A HONEYCOMB

(75) Inventors: Bruce P. Allen, Lawrenceville, PA (US); Richard A. Foster, Horseheads, NY (US); Wade E. MacLaren, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/087,061

(22) Filed: Feb. 28, 2002

(65) Prior Publication Data

US 2003/0161945 A1 Aug. 28, 2003

(51) Int. Cl.$^7$ .................. B23K 26/00; B29C 57/10; B01D 39/20
(52) U.S. Cl. ............... 264/400; 264/40.1; 264/156; 264/273; 264/275; 264/406; 264/628; 524/430; 524/436; 524/437; 219/121.71; 219/121.82; 219/121.83; 55/523
(58) Field of Search ................. 264/400, 482, 264/156, 273, 275, 277, 269, 122, 628, 421, 406; 219/121.7, 121.71, 121.82, 121.83; 156/253, 278, 310; 55/528, 498, DIG. 30; 422/180; 524/430, 436, 437

(56) References Cited

U.S. PATENT DOCUMENTS

| | | | | |
|---|---|---|---|---|
| 4,225,546 A | * | 9/1980 | Ohno | 264/114 |
| 4,329,162 A | * | 5/1982 | Pitcher, Jr. | 55/523 |
| 4,403,008 A | * | 9/1983 | Factor | 428/117 |
| 5,322,537 A | * | 6/1994 | Nakamura et al. | 55/523 |
| 6,256,121 B1 | * | 7/2001 | Lizotte et al. | 359/15 |
| 2002/0020944 A1 | | 2/2002 | Yamaguchi et al. | |

FOREIGN PATENT DOCUMENTS

| | | | |
|---|---|---|---|
| JP | 03-169312 | * | 7/1991 |
| JP | 03-232511 | * | 10/1991 |
| JP | 09-025180 | * | 1/1997 |

OTHER PUBLICATIONS

Derwent Abstract—JP 62–057624 A, 1987.*

* cited by examiner

Primary Examiner—Stefan Staicovici
(74) Attorney, Agent, or Firm—Anca C. Gheorghiu

(57) ABSTRACT

A method for plugging selected cell channels in a honeycomb structure for the fabrication of a solid particulate filter. The method includes covering a first end face of the honeycomb structure with a mask having openings corresponding to open ends of a first plurality of cell channels; loading powdered plugging material from through the mask openings into the first plurality of cell channels; forming plugs in the first plurality of cell channels at ends opposite the first end face of the honeycomb structure; loading powdered plugging material into the open ends of a second plurality of cell channels open at the second end face of the honeycomb structure; and forming plugs in the second plurality of cell channels at the ends adjacent the first end face of the honeycomb structure.

7 Claims, 8 Drawing Sheets

FIG. 1

Provide a honeycomb structure having first and second end faces, and a multiplicity of cell channels extending in a parallel fashion therethrough. — 100

Cover the first end face of the honeycomb structure with a mask having holes corresponding to a first plurality of cell channels. — 102

Load plugging material in the first plurality of cell channels through openings in the mask. — 104

Form plugs in the first plurality of cell channels at ends adjacent the second end face of the honeycomb structure. — 106

Load plugging material in the second plurality of cell channels being open at the second end face of the honeycomb structure. — 108

Form plugs in the second plurality of cell channels at ends adjacent to the first end face of the honeycomb structure. — 110

METHOD FOR PLUGGING SELECTED CELLS IN A HONEYCOMB

BACKGROUND OF THE INVENTION

The present invention relates to selectively plugged honeycomb structures, and in particular, to a method and apparatus for use in selectively sealing cells of a honeycomb structure with a powdered plugging material.

Honeycomb structures having transverse cross-sectional cellular densities ranging between 10 and 300 cells/in$^2$ (about 1.5 to 46.5 cells/cm$^2$), more typically between about 100 and 200 cells/in$^2$ (about 15.5 to 31 cells/cm$^2$) and wall thicknesses of between 0.010 and 0.030 in. (about 0.25 to 0.76 mm), especially when formed from ceramic materials are used as solid particulate filter bodies, and require selected cell channels of the structure to be closed or plugged at one or both of their ends.

It is well known that a solid particulate filter body, such as a diesel particulate filter, may be formed by a matrix of intersecting, thin, porous walls which extend across and between two of its opposing end faces and form a large number of adjoining hollow passages or cell channels which also extend between and are open at the end faces of the structure. To form a filter, one end of each of the cell channels is closed, a first subset of cell channels being closed at one end face and the remaining cell channels being closed at the remaining opposing end face of the structure. Either of the end faces may be used as the inlet face of the resulting filter. The contaminated fluid is brought under pressure to the inlet face and enters the body via those cells which have an open end at the inlet face. Because these cell channels are closed at the outlet end face of the body, the contaminated fluid is forced through the thin, porous walls into adjoining cells which are sealed at the inlet face and open at the outlet face of the filter body. The solid particulate contaminant in the fluid which is too large to pass through the porous openings in the walls is left behind and a cleansed fluid exits the filter body through the outlet cell channels, for use.

Up to this time selected cells were sealed or plugged with a foam-type cement, as disclosed in U.S. Pat. Nos. 4,297,140, 4,239,357 and 4,559,193. The cement is formed into a paste by mixing ceramic raw material with an aqueous binder, such as methyl cellulose, plasticizer and water. When using this foam-type cement, both ends of the honeycomb structure are covered with flexible masks having holes through which the cement is pushed into the ends of the cells. There are numerous disadvantages associated with this type of filling or plugging material. The masks must be cleaned and dried after each use. Unclean masks can cause missing plugs requiring additional manual labor. The cement batch is time, shear and temperature dependent; often thrown out, unused due to age restrictions; and, drying is required to remove the water content.

SUMMARY OF THE INVENTION

The process of the invention is provided to overcome the disadvantages of prior art plugging methods. The process is particularly suited for using only one mask and charging a powdered plugging material into selected cells of a honeycomb structure for later use in diesel particulate filters. Powdered plugging material" as used in the description of the present invention means a material which is formed of particulates. This type of plugging material is in contrast to current prior art plugging materials which are a cement, having a wet, paste-like consistency. Although any powdered plugging material suitable for forming plugs may be used in the present invention, the preferred material comprises particulate sealant as described and claimed in co-pending patent application filed concurrently with the present application in the names of by M. Fabian, S. Lakhwani, and M. Roberts under the title PARTICULATE SEALANT FOR FILTER PLUG FORMING.

In the process of the present invention, a ceramic honeycomb filter body is fabricated from a honeycomb structure having a plurality of cell channels extending therethrough which are arranged in mutually parallel rows and in mutually parallel columns at its end faces. A first end face of the honeycomb structure is covered with a mask having openings corresponding to open ends of a first plurality of cell channels. Powdered plugging material is loaded through the mask openings into the first plurality of cell channels at open cell ends adjacent the first end face. The plugging material being composed of a multiplicity of particulates passes or flows the length of the cell channel to the remaining cell ends opposing the first end face and adjacent the second end face. In the process of forming plugs thereat, the powdered plugging material is compacted by suitable compaction means such as vibration, centrifuging, manual compaction and the like, and then heated to a temperature sufficient to form a flowable material which fills and adheres to all four walls of the cells. Upon cooling the flowable material solidifies to form plugs at the cell ends.

Thereafter, the mask is removed from the first end face, and the plugging process is repeated for the second end face. However, a mask need not be provided for the second end face. The so-plugged cell channels at the second end face effectively function to form a mask for plugging the first end face. Powdered plugging material is loaded into the open ends of a second plurality of cell channels, the second plurality of cell channels corresponding to open cell channels at the second end face of the honeycomb structure; and, plugs are formed as before at the ends of cell channels opposing the first end face of the honeycomb structure.

In a preferred embodiment the step of covering the first end face of the honeycomb structure includes applying a solid transparent film across and onto the first end face of the honeycomb structure; scanning the film to locate the first plurality of cell channels; generating in response to the scanning step a first set of signals indicating the location of the first plurality of cell channels; generating in response to the first set of signals a second set of signals for positioning an opening forming tool, i.e., a laser, with respect to the first plurality of cell channels; and, activating the opening forming tool in response to the second set of signals whereby openings are formed through the film corresponding to the first plurality of selected cell channels.

BRIEF DESCRIPTION OF THE DRAWINGS

The various aspects of the present invention may be more clearly understood with reference to the accompanying figures in which:

FIG. 1 is a flow chart illustrating a process for selectively plugging cell channels of a honeycomb structure in accordance with the present invention.

DETAILED DESCRIPTION OF THE INVENTION

One significant use of the present invention is in the fabrication of solid particulate filters, such as diesel particulate filters. The practice of the inventive method in the fabrication of such filter bodies is now described with reference to FIGS. 1 through 9.

According to the invention, a first end face of the honeycomb structure is covered with a mask formed from a solid, either resilient or rigid material having a number of openings extending through it which are located to coincide with open ends of a first plurality of cell channels. Powdered particulate material is charged through the mask openings into the selected cell channels to form plugs at opposite cell channel ends, i.e., adjacent the second end face of the honeycomb structure. Powdered plugging material is further charged into the remaining open cell channels at the second end face to form plugs in those cell channels at their ends adjacent the first end face. The resulting plugged honeycomb structure is formed with an arrangement of alternate plugged cell channels at one end face and a similar but reverse pattern at the opposing, second end face.

Figure 2:
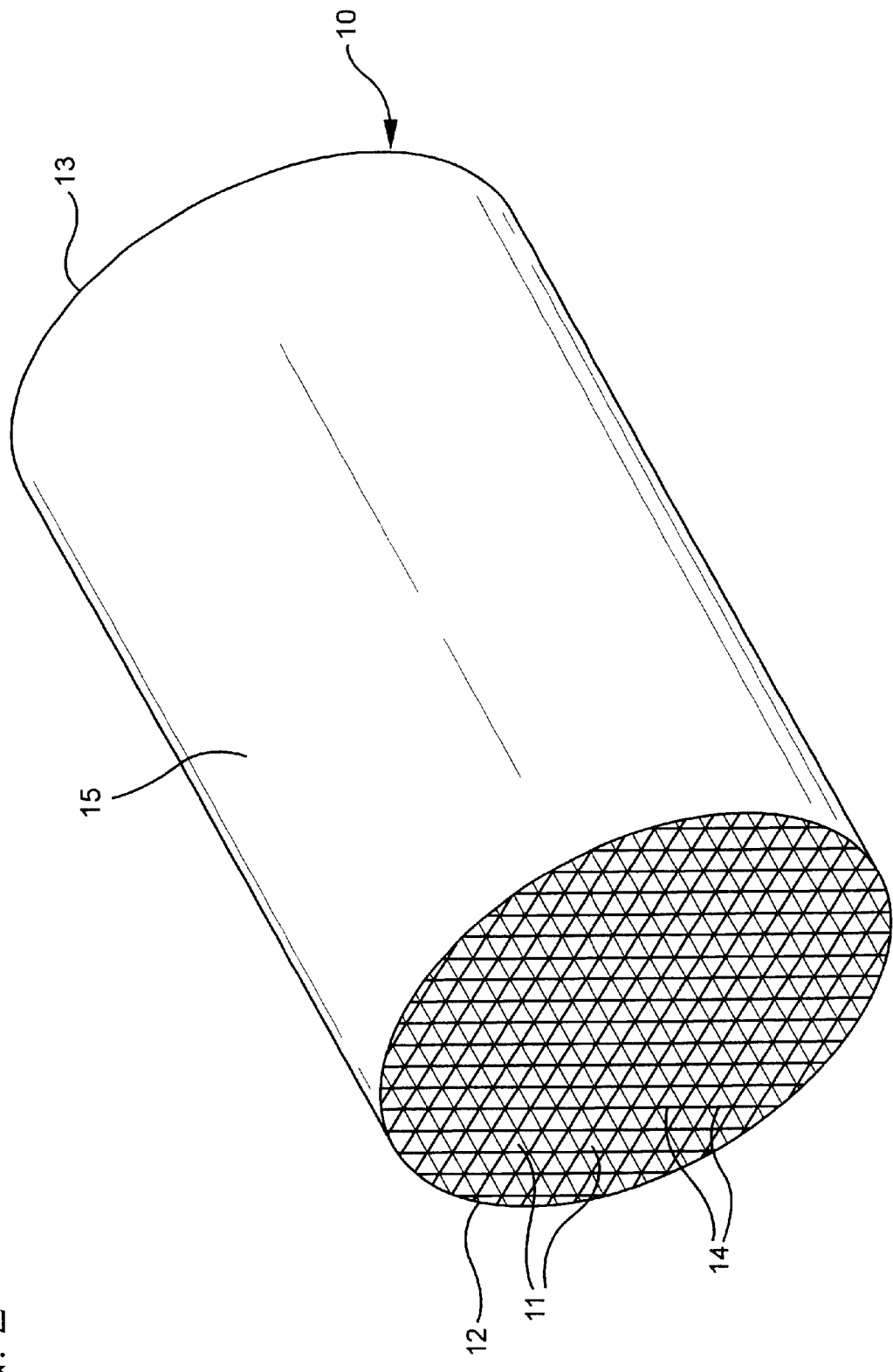
FIG. 2 is a profile view of a honeycomb structure as used in the present invention.

The process of forming a filter structure, as shown in FIG. 1 starts with providing a honeycomb structure (ST100). A suitable honeycomb structure 10 for purposes of the present invention is illustrated in FIG. 2. Honeycomb structure 10 has a large number of adjoining cell channels 11 extending in an essentially mutually parallel fashion through it, the ends of the cell channels 11 originally being open at and forming a pair of open surfaces at opposing end faces 12 and 13 of the structure 10. The cell channels 11 are themselves formed by a matrix of intersecting walls 14 which extend across and between each end face 12 and 13 (hidden). For filter body applications, the walls 14, are continuous, porous and preferably uniformly thin. A "skin" 15 is typically provided around the cell channels 11 between the end faces 12 and 13. For illustrative purposes only, the cell channels 11 of the structure 10 are provided with square, transverse cross-sectional areas and are arranged at the end face 12 and 13 in substantially mutually parallel rows and substantially mutually parallel columns. It will be appreciated that other transverse cross-sectional cellular geometries and other arrangements of cell channels may be utilized generally in both the fabrication of solid particulate filter bodies and in the application of the inventive method.

Honeycomb structures for solid particulate filter bodies and other applications may be formed of a variety of materials including ceramics, glass-ceramics, glasses, metals, and by a variety of methods depending upon the material selected. Honeycomb structures having the necessary uniformly thin, porous and interconnected walls for solid particulate filtering applications are preferably fabricated from plastically formable and sinterable finely divided particles of substances that yield a porous, sintered material after being fired to affect their sintering. Suitable materials include metallics, ceramics, glass-ceramics, and other ceramic based mixtures. A method of forming such a ceramic honeycomb monolith from an extruded cordierite material which is preferred in solid particulate filtering applications is described and claimed in U.S. Pat. No. 5,258,150 co-assigned to the present assignee, and incorporated in its entirety by reference, herein.

Figure 3:
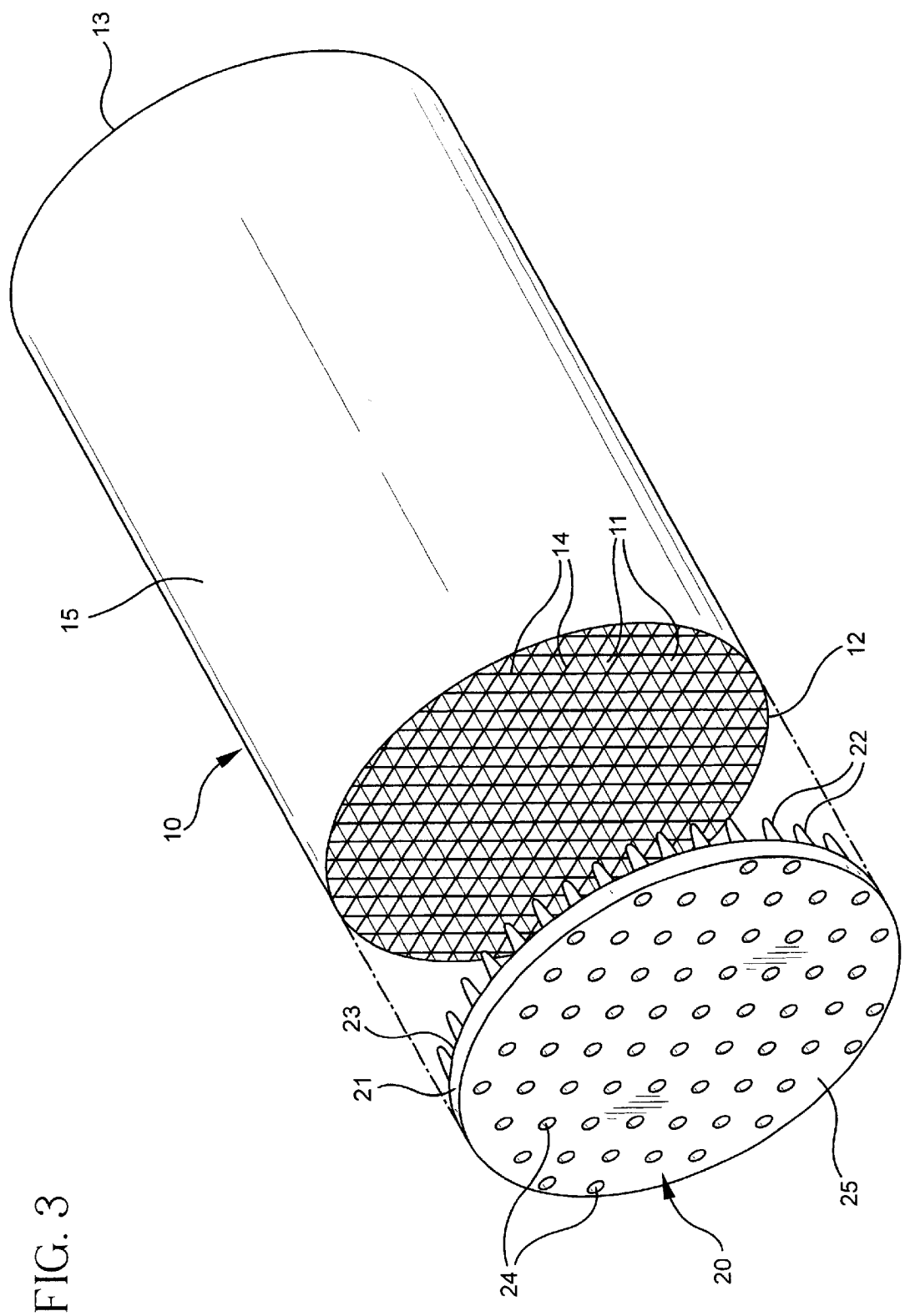
FIG. 3 is a schematic view of a honeycomb structure and a flexible mask being applied to a first end face.

The next step involves covering a first end face, either 12 or 13 with a mask which is secured over the open ends of the cell channels 11(ST102). In one embodiment, as illustrated in FIG. 3, the covering step comprises providing a flexible mask 20 which can be fitted to end face 12 of honeycomb structure 10, as described in U.S. Pat. No. 4,411,856, co-assigned to the present assignee, and herein incorporated by reference in its entirety. The mask 20 is formed with a central body 21 having a multiplicity of protrusions 22 extending in a substantially normal direction from a substantially planar outer surface 23 of the central body 21. The mask 20 is further provided with a plurality of openings 24, extending through the central body 21 between and through the outer surface 23 and an opposing surface 25. For illustrative purposes, the protrusions 22 and openings 24 are alternated with each other across the outer surface 23 of the mask 20. The outer face 23 of the mask 20 is fitted to the end face 12 of honeycomb structure 10, with each of the protrusions 22 filing and preferably sealing the open ends of alternate cell channels at the end face 12 and each of the openings 24 positioned juxtaposed to the open ends of the other remaining alternate cell channels.

Figure 4:
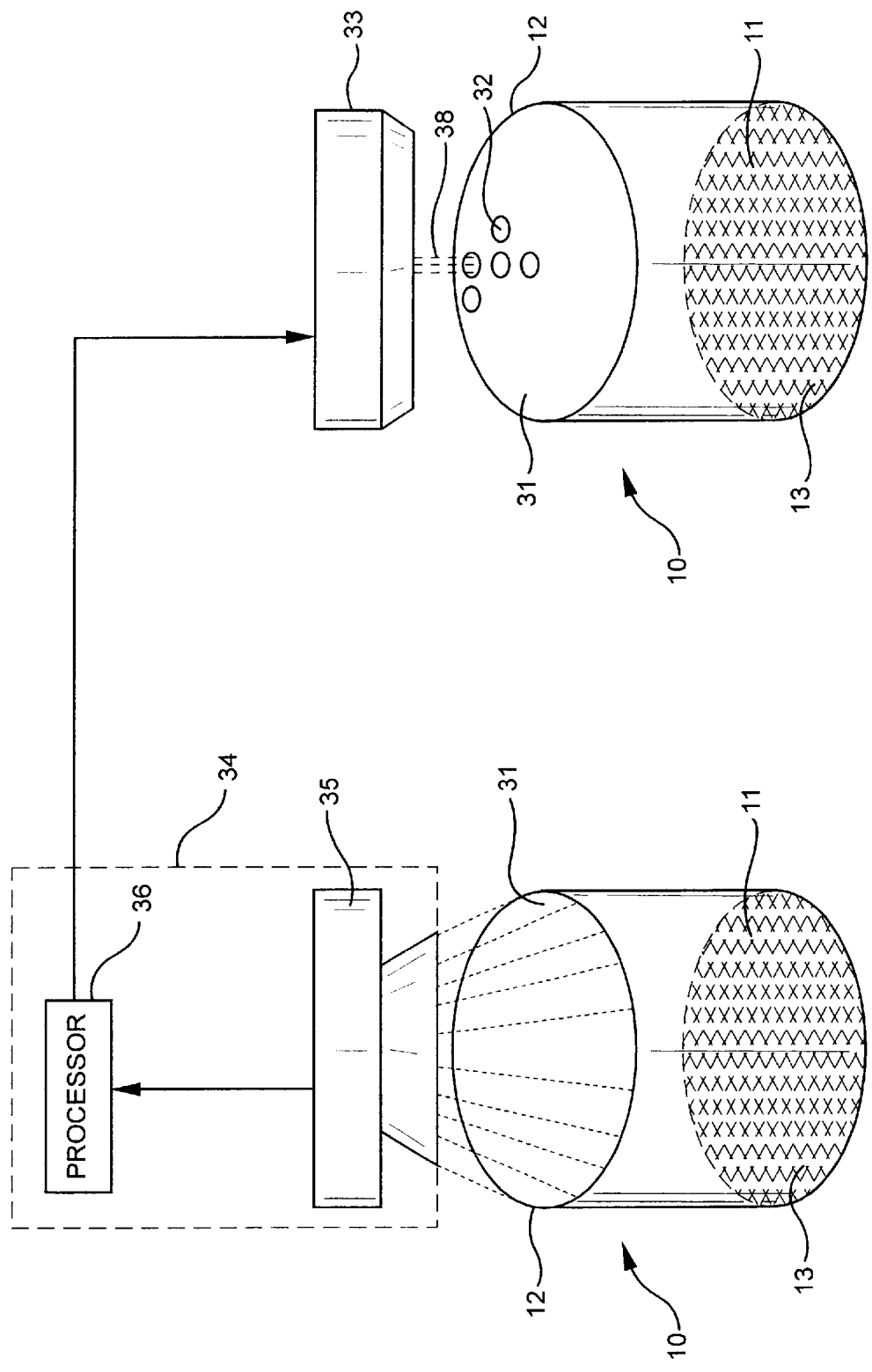
FIG. 4 is a schematic view of a preferred embodiment of the step of covering a first end face of the honeycomb structure according to the present invention; shown is a honeycomb structure with a covering and an opening forming tool for forming a mask at the first end face.
Figure 5:
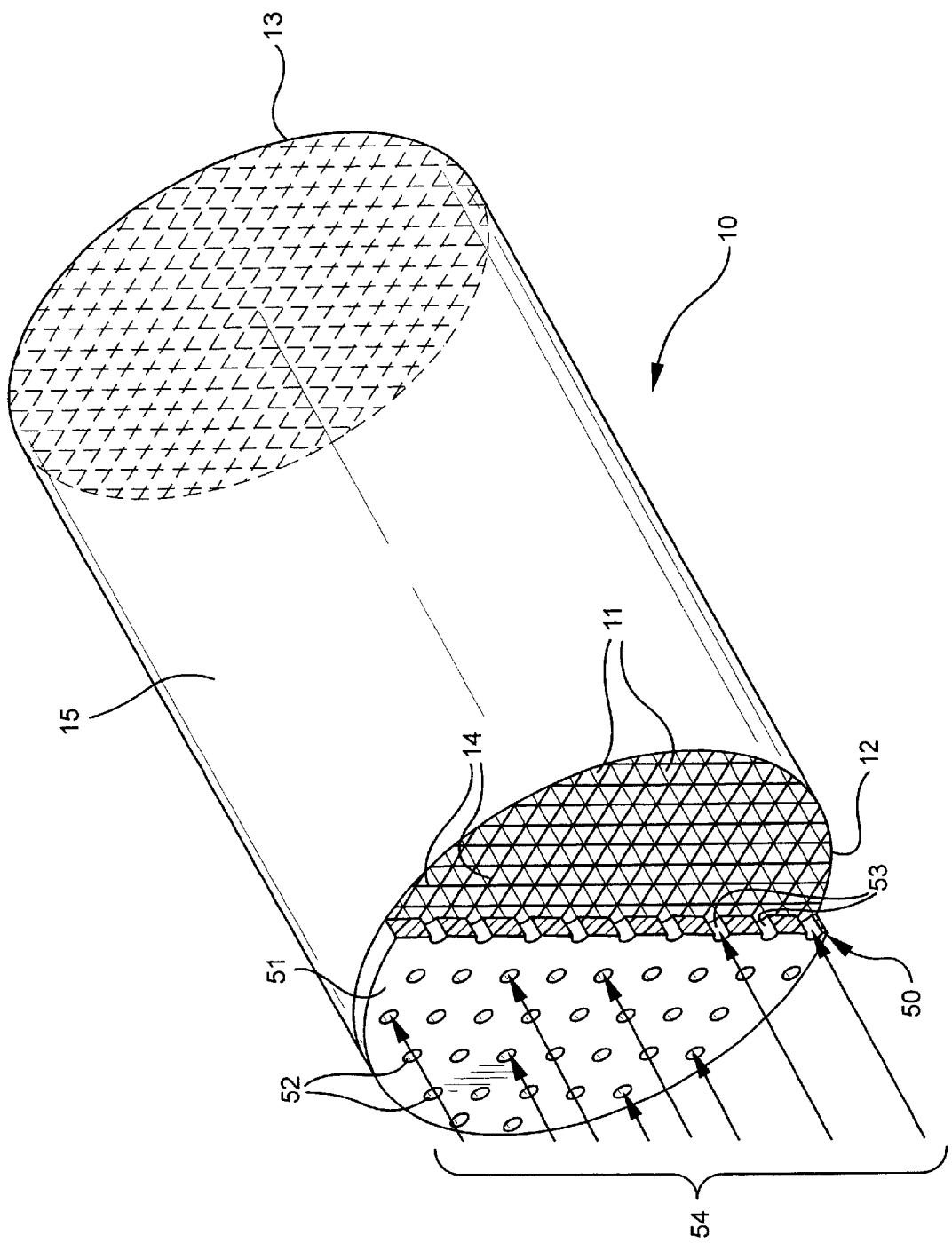
FIG. 5 is a partially sectioned mask made according to the process of FIG. 4 fitted to a honeycomb structure with which it is used.

In another embodiment, which is preferred, as illustrated in FIG. 4, the covering step comprises forming a mask according to the process described in U.S. Pat. No. 4,557,773, co-assigned to the present assignee and herein incorporated by reference. In this embodiment, the open end face 12 of honeycomb structure 10 is once again selected to be plugged first, and is covered with a thin transparent film 31, preferably an adhesive backed, pressure-sensitive film formed from a thermoplastic, preferably a polyester. Openings 32 are created through the film 31 corresponding to selected cell channels 11 at the end face 12 by means of an opening forming tool 33 controlled by an optical image analyzer 34. Mask openings have an area that substantially matches that of cell channels 11. The opening forming tool 33 comprises a commercially available laser which can burn or cut openings through film 31 with single beam 38 or multiple beams. A suitable laser is a Laser/Galvo system model LB1010 having one or more 100 watt $CO_2$ "sealed gas" lasers available from Laser Machining, Inc. of Sommerset, Wis. The optical image analyzer 34 consists of a television camera 35 or other optical device which scans the end face 12 through the transparent film 31 and generates signals indicating the location of the cell channels 11 beneath the film 31. The signals generated by the camera 35 are carried to a microprocessor 36 which in turn outputs signals for directly positioning and controlling the operation of the opening forming tool or laser 33 to create openings 32 through the film 31 adjacent selected cell channels 11 at the end face 12. An exemplary mask formed according to the above described procedure is illustrated in FIG. 5. Mask 50 has a central body 51 with opposing outer faces 52 and 53 and a number of openings 54 extending through the body 51 and between surfaces 52 and 53. The openings are positioned in the body so as to coincide with the ends of a first subset of cell channels 11 which are to be charged. The openings 54 are suitably sized to expose the open ends of the cell channels 11 but not so large to expose adjacent cell channels. However, larger openings can be provided to expose several adjacent cell channels if desired. Mask 50 is positioned with lower surface 53 of mask body 51 to cover the entire end face 12 of the honeycomb structure 10. Mask body 51 is adhered to intersecting matrix of walls 14 of honeycomb structure 10 to hold mask 50 in position.

Figure 6:
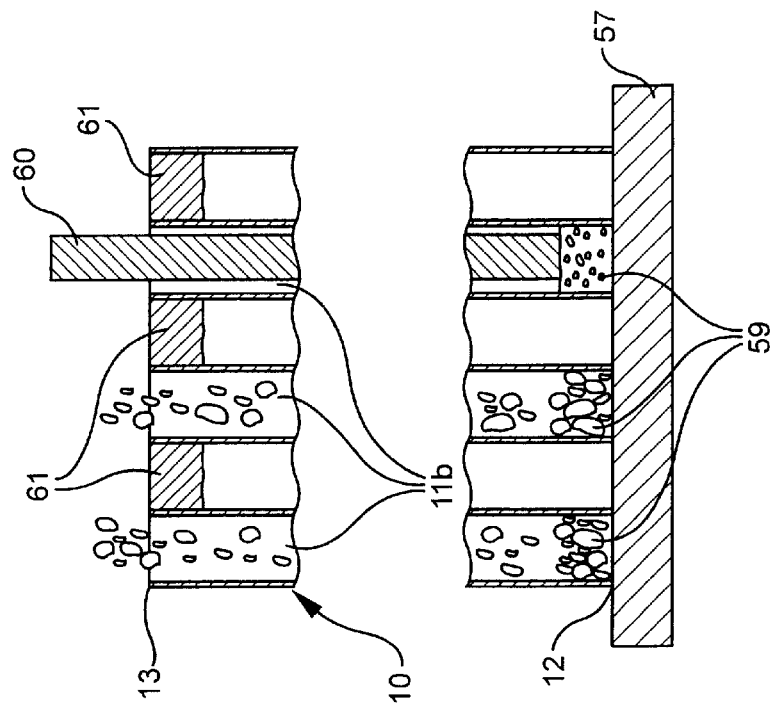
FIG. 6 is an expanded, sectioned view illustrating the step of plugging the second end face of the honeycomb structure.
Figure 7:
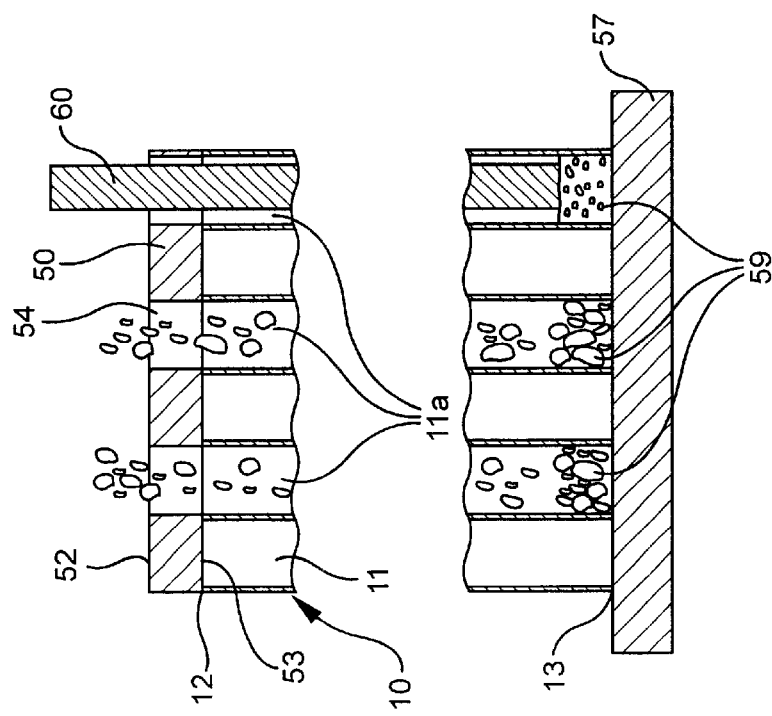
FIG. 7 is an expanded, sectioned view illustrating the step of plugging the first end face of the honeycomb structure.

The next step (ST104) involves loading powdered plugging material into a first plurality of cell channels at first end face 12. This first plurality of cell channels 11a are open at end face 12 and adjacent openings 54 in the mask 50 attached thereto. Referring now to FIGS. 6 and 7, the powdered plugging material denoted by number 59 is loaded through mask openings 54, entering the cell channels 11a through the open cell ends and passing the length of the cell channels to gather at the cell ends adjacent end face 13 of honeycomb structure 10. Preferably, honeycomb structure 10 is positioned on a platform 57, to prevent the plugging material from escaping the cell channels loaded therein. For reasons which will become apparent later, platform 57 is provided with heating means (not shown), as known in the art. The powdered plugging material is charged in an amount to achieve a plug depth of between 0.04 inch (1 mm) to 0.60 inch (15.5 mm), and preferably 0.3 inch (7.5 mm) to 0.5 inch (12.7 mm) in the cell channels of the honeycomb structure. How the powdered plugging material is charged or loaded into the cell channels is not important to the present invention and can include any means, such as sifting, pouring and injecting. It is envisioned that the charging process can be automated, for example by using a suitable pressurized air actuated gun whose nozzle can be positioned at the proper cell openings on the end faces so as to inject the powdered plugging material into selected cell channels.

Unlike prior art methods which use a wet, paste-like cement for plugging, the present invention is especially suited for a non-aqueous powdered plugging material. In particular, the powdered plugging material suitable for the practice of the present invention comprises particulate sealant as described and claimed in co-pending patent application filed concurrently with the present application in the names of by M. Fabian, S. Lakhwani, and M. Roberts under the title PARTICULATE SEALANT FOR FILTER PLUG FORMING, which is incorporated by reference in its entirety herein. The particulate sealant taught therein has a formulation consisting essentially, by weight, of about 70 to 90% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3·5SiO_2$) on firing, and about 10 t 30% non-aqueous binder comprising a polymer selected from the group consisting of high molecular weight thermoplastic polymer and thermosetting resin. The composition of particulate sealant preferred in the practice of the present invention consists essentially of about 78 to 84% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3·5SiO_2$) on firing, and about 16 to 28% non-aqueous binder, the binder consisting essentially, by weight, of about 9.5–15.0% low melting wax selected from the group consisting of fatty alcohol, fatty acid, fatty glycol, and fatty glyceride waxes, about 5% tri-block styrene-ethylene/butylene-styrene thermoplastic copolymer, and about 2% dispersant.

The next step ST106 involves forming plugs in the first plurality of cell channels. In the process of forming plugs, the powdered plugging material is first compacted at the cell ends by any suitable compaction means, including hand or mechanical compaction, vibration or centrifuge. In FIG. 6 and 7, mechanical compaction is illustrated. Specifically, a long rod-like member 60 is inserted into the cell channel to tap and press-down the particles of the plugging material into a mass shown at 61. The rod-like member preferably has the same surface area as the individual cell channels of the honeycomb structure. Compaction of the plugging material ensures strong dense green and fired plugs that bond to all four cell walls.

Platform 57 is next heated to a temperature sufficient to melt the binder in the plugging material and form a flowable liquid which fills and adheres to all four walls of the cells, as described in co-pending patent application filed concurrently with the present application in the names of by M. Fabian, S. Lakhwani, and M. Roberts under the title PARTICULATE SEALANT FOR FILTER PLUG FORMING. Upon cooling, re-gelling occurs in the binder and the plugging material re-solidifies maintaining the so-formed plug shape at the cell ends. During experimental trials the heating was done at 120° C. for 15 minutes. Regardless, the heating temperature and length of time are dependent on the composition of plugging material in use and is easily determinable therefrom. Following cooling, green plugs 61 are formed in a first plurality of cell channels 11a adjacent the first end face 12 of honeycomb structure 10.

At this point in the process the mask thereat is removed from end face 12. Remaining thereat is a pattern of alternately plugged cells which in the present invention is used as the mask for forming plugs in the cell ends at the remaining end face 13. Therefore, it is not necessary to cover end face 13 with a mask as was done with end face 12. The plugging process described above is repeated for end face 13, with reference to FIG. 7 (ST110). The resulting plug pattern at end face 13 is the reverse of the plug pattern at end face 12. To develop the final structure in the plugs, the sealed or plugged honeycomb is fired or sintered at a temperature of about 1350° C. to 1450° C. for a period of time sufficient to form cordierite, as taught in U.S. Pat. No. 5,258,150.

Figure 8:
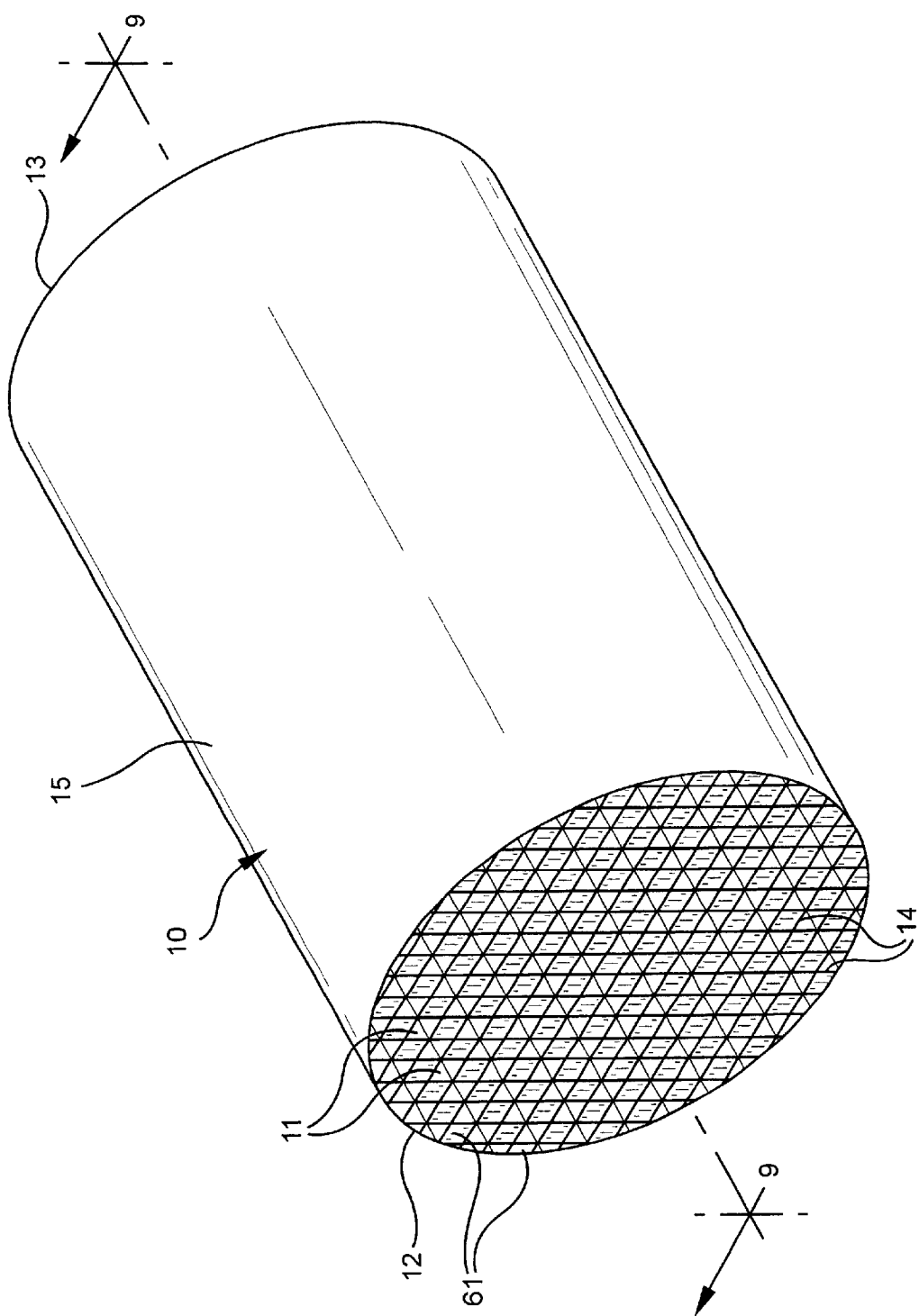
FIG. 8 is a profile view of a solid particulate filter body fabricated according to the present invention; and, FIG. 9 is a sectioned view of the filter body of FIG. 8 along the lines 9—9.
Figure 9:
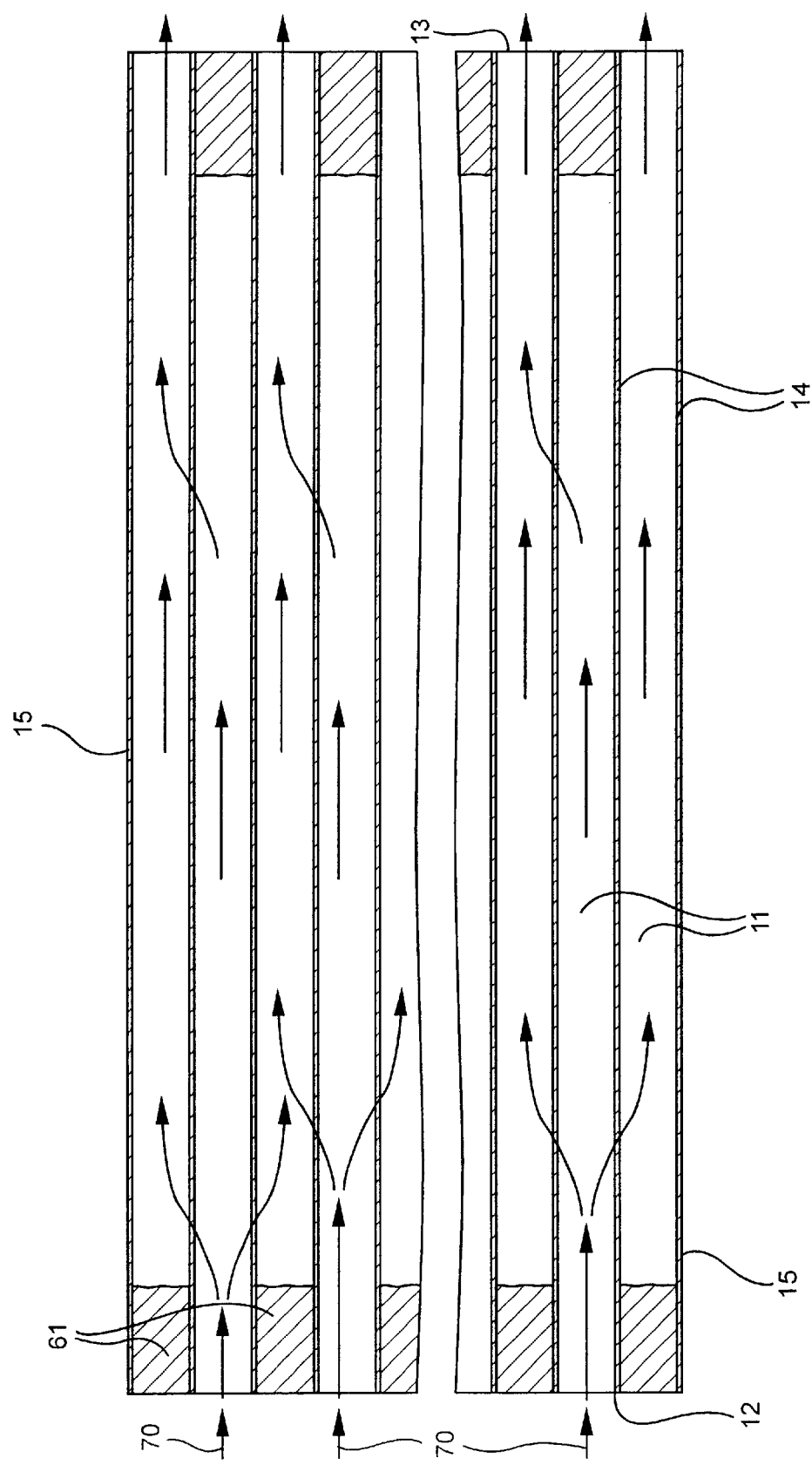

A solid particulate filter body of the type being referred to and fabricated according to the process of the invention is illustrated in FIGS. 8 and 9. FIG. 8 shows a honeycomb structure 10 comprising a plurality of parallel end-plugged cell channels 11 traversing the body from a first or inlet end face 12 to a second, opposing or outlet end face 13. FIG. 9 shows the pattern of fluid flow through the filter body. Fluid flow is indicated by lines 70 with arrows. Thus, fluid 70 passes from first end face 12 into the open cell channels, but because of the blocking effect of plugs 61 at end face 13, the fluid under some pressure than passes through the pores or open porosity in cell walls 14 at the top, bottom and both sides of adjacent cell channels. While fluid 70 passes through the entirety of all cell walls 14, their porosity is such as to restrain particulates therein and thereon as a porous accumulation. The fluid 70 then flows out of open cell channels at the outlet end face 13.

An advantage of the present invention is that the time for plugging or sealing cell channels of honeycomb structures in the fabrication of solid particulate filters is optimized, i.e., minimized, namely by using only one mask at one end face and eliminating the use of a second mask at the opposing end face of the honeycomb structure.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A method for plugging selected cell channels in a honeycomb structure, the method comprising:
   a. providing a honeycomb structure having a multiplicity of adjoining cell channels extending in a mutually parallel fashion between opposing end faces, the cell channels being formed by a matrix of intersecting porous, thin walls which extend across and between the opposing first and second end faces, the cell channels having open ends at each of the end faces of the honeycomb structure;
   b. covering the first end face of the honeycomb structure with a mask for charging plugging particulate material into a first plurality of cell channels, the mask comprising a body having a plurality of openings extending therethrough from an outer face thereof to an opposing face thereof positioned juxtaposed the first end face of the honeycomb structure, the openings being sized and positioned across the body to expose therethrough open ends of the first plurality of cell channels;
   c. loading powdered plugging material comprising particulate sealant, from the mask outer face through the mask openings into the first plurality of cell channels having open cell ends adjacent the first end face of the honeycomb structure, wherein the particulate sealant consists essentially, by weight, of 70 to 90% ceramic blend, the ceramic blend being raw ceramic materials selected to form a composition consisting essentially of in percent by weight 12 to 16% MgO, 33 to 38% $Al_2O_3$, and 49 to 54% $SiO_2$, which will form cordierite ($2MgO.2Al_2O_3.5SiO_2$) on firing, and 10 to 30% non-aqueous binder comprising a polymer selected from the group consisting of high molecular weight thermoplastic polymer and thermosetting resin;
   d. passing the powdered plugging material through the length of the first plurality of cells to reach the cell ends opposing the first end face and adjacent the second end face of the honeycomb structure;
   e. forming plugs in the first plurality of cell channels at the cell ends opposing the first end face and adjacent the second end face of the honeycomb structure;
   f. loading powdered plugging material into the open ends of a second plurality of cell channels, the second plurality of cell channels corresponding to cell channels having open ends at the second end face of the honeycomb structure;
   g. passing the powdered plugging material through the length of the second plurality of cells to reach the cell ends opposing the second end face and adjacent the first end face of the honeycomb structure; and,
   h. forming plugs in the second plurality of cell channels at cell ends opposing the second end face and adjacent the first end face of the honeycomb structure.

2. The method of claim 1 wherein the step of covering the first end face of the honeycomb structure comprises:
   applying a solid transparent film across and onto the first end face of the honeycomb structure;
   scanning the film to locate the first plurality of cell channels;
   generating in response to the scanning step a first set of signals indicating the location of the first plurality of cell channels;
   generating in response to the first set of signals a second set of signals for positioning an opening forming tool with respect to the first plurality of cell channels; and,
   activating the opening forming tool in response to the second set of signals whereby openings are formed through the film corresponding to the first plurality of selected cell channels.

3. The method of claim 2 wherein the opening forming tool is a laser.

4. The method of claim 1 wherein the step of covering the first end of the honeycomb structure comprises:
   providing a flexible mask having a first plurality of flexible protrusions extending from an outer surface thereof, and a second plurality of openings extending completely therethrough from the outer surface to an opposing surface thereof.

5. The method of claim 1 wherein the step of forming plugs at the first and second end faces the honeycomb structure comprises
   compacting the powdered plugging material by means selected from the group consisting of mechanical compaction, vibration and centrifuge;
   heating the compacted plugging material to a temperature and for a period of time sufficient to form a flowable material capable of filling the cell ends and adhering to all cell walls; and,
   cooling to solidify the material at the cell ends.

6. The method of claim 1 further comprising firing the honeycomb structure to a temperature and for a time sufficient to develop the desired ceramic structure in the plugs.

7. The method of claim 1 wherein the particulate sealant consists essentially, by weight, of 78 to 84% ceramic blend, the ceramic blend being raw ceramic materials selected to form a composition consisting essentially of in percent by weight 12 to 16% MgO, 33 to 38% $Al_2O_3$, and 49 to 54% $SiO_2$, which will form cordierite ($2MgO.2Al_2O_3.5SiO_2$) on firing, and 16 to 28% non-aqueous binder, the binder consisting essentially, by weight, of 9.5–15.0% low melting wax selected from the group consisting of fatty alcohol, fatty acid, fatty glycol, and fatty glyceride waxes, 5% tri-block styrene-ethylene/butylene-styrene thermoplastic copolymer, and 2% dispersant.

* * * * *